(12) United States Patent
He et al.

(10) Patent No.: US 11,420,194 B2
(45) Date of Patent: Aug. 23, 2022

(54) VISIBLE LIGHT CATALYST, PREPARATION AND APPLICATION THEREOF

(71) Applicant: CHINESE RESEARCH ACADEMY OF ENVIRONMENTAL SCIENCES, Beijing (CN)

(72) Inventors: Xiaosong He, Beijing (CN); Beidou Xi, Beijing (CN); Jun Cui, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 195 days.

(21) Appl. No.: 16/840,357

(22) Filed: Apr. 4, 2020

(65) Prior Publication Data
US 2021/0170383 A1 Jun. 10, 2021

(30) Foreign Application Priority Data

Dec. 10, 2019 (CN) .......................... 2019112616159

(51) Int. Cl.
*B01J 35/00* (2006.01)
*B01J 23/30* (2006.01)
*B01J 35/02* (2006.01)
*B01J 37/02* (2006.01)
*B01J 37/04* (2006.01)
*C02F 1/72* (2006.01)
*C02F 101/10* (2006.01)
*C02F 101/30* (2006.01)
*C02F 103/06* (2006.01)

(52) U.S. Cl.
CPC ............. *B01J 35/004* (2013.01); *B01J 23/30* (2013.01); *B01J 35/023* (2013.01); *B01J 37/0215* (2013.01); *B01J 37/04* (2013.01); *C02F 1/725* (2013.01); *C02F 2101/101* (2013.01); *C02F 2101/306* (2013.01); *C02F 2103/06* (2013.01)

(58) Field of Classification Search
None
See application file for complete search history.

(56) References Cited

U.S. PATENT DOCUMENTS

2011/0287174 A1* 11/2011 Calabrese Barton ........................ H01M 4/8652 427/115
2017/0033367 A1* 2/2017 Fukuta .................. B01D 53/86

* cited by examiner

*Primary Examiner* — Sheng H Davis
(74) *Attorney, Agent, or Firm* — CBM Patent Consulting, LLC

(57) ABSTRACT

A visible light catalyst, its preparation method, a visible light catalyst activated persulfate system and its use. The visible light catalyst includes a carbon material, a transition metal compound and a coating material. The carbon material is conductive carbon material, and the transition metal compound is selected from one or more of transition metal oxides, transition metal sulfides, and acid or salt compounds containing a transition metal. The visible light catalyst has high visible light photocatalytic activity and performance of degrading organic pollutants and activating persulfate which can result in synergistically degrading degradation-resistant organic pollutants.

9 Claims, 7 Drawing Sheets

VISIBLE LIGHT CATALYST, PREPARATION AND APPLICATION THEREOF

This application claims priority to Chinese Patent Application Ser. No. CN2019112616159 filed on 10 Dec. 2019.

FIELD OF THE INVENTION

The present invention belongs to the field of multifunctional environmental materials and water treatment, and especially relates to a visible light catalyst, preparation method and use thereof.

PRIOR ART

In recent years, the surface water and groundwater have been polluted to different degrees since the wide use and massive discharge of organic products, such as drugs, personal care products and detergents and so on. Thereby it creates new challenges on water treatment because of its characteristics such as polycyclic structure, complex structure, strong stability, poor biodegradability and difficulty in handling. And consequently, it is of great significance to water quality assurance and improvement of water environment by studying on the treatment of organic wastewater, particularly on degradation-resistant organic matter.

Under the excitation by activator, persulfate produces highly reactive sulfate radicals to oxidize degradation-resistant organic matter. Meanwhile, persulfate advanced oxidation technology is widely used in treatment of organic wastewater due to the characteristics of strong oxidizing ability and high selectivity. However, the existing activators mainly rely on iron-based powdery activator which is difficult to recover after reaction, increases the content of ferric iron in the treated water, and results in secondary pollution. In addition, persulfate advanced oxidation technology is applicable to the treatment of high-concentration organic wastewater, but it cannot satisfy the requirement of low-concentration organic wastewater treatment. In conclusion, the problems mentioned above restrict the further application of persulfate advanced oxidation technology.

Photocatalysis technology is to degrade organic pollutants by the energy of sunlight, and is recognized as a green water treatment technology. Photocatalyst can generate photo-induced electrons under the condition of light, which is likely to activate persulfate. Therefore, the photocatalyst is used in the study to activate persulfate and enhance the efficiency of degradation.

Therefore, there is an urgent need to develop a visible light catalyst which can effectively activate persulfate and is easy to recycle.

DETAILED DESCRIPTION OF THE INVENTION

In order to overcome the above problems, a study is intensively made to develop a visible light catalyst and its preparation, and construct a visible light catalyst activated persulfate system. The visible light catalyst includes a carbon material, a transition metal compound and a coating material. The carbon material is conductive carbon material, and the transition metal compound is selected from one or more of transition metal oxides, transition metal sulfides, and acid or salt compounds containing a transition metal. The visible light catalyst has high photocatalytic activity, and performance of degrading organic pollutants and activating persulfate which can result in synergistically degrading degradation-resistant organic pollutants. Therefore, it can be well used in water treatment field, including the treatment of groundwater, landfill leachate, organic wastewater, road rainwater and so on. The visible light catalyst activated persulfate system of the present invention can solve the problem that persulfate oxidation technology cannot degrade organic pollutants completely. Moreover, the granular visible light catalyst has the advantage of easy recovery which can reduce the risk of secondary pollution caused by traditional iron-based persulfate activator, thereby completing the present invention.

The first aim of the present invention is to provide a visible light catalyst (i.e., visible light responsible or driven catalyst or photocatalyst), which includes a carbon material and a transition metal compound. The carbon material is conductive carbon material, and the transition metal compound is selected from one or more of transition metal oxides, transition metal sulfides, and acid or salt compounds containing a transition metal.

Wherein, the visible light catalyst further includes a coating material. The carbon material is selected from one or more of graphene, graphene oxide, carbon nanotube, fullerene and reduced graphene oxide; the transition metal compound is selected from one or more of Ti, Mo, W, Cd, Fe, V and Ni; and the coating material is selected from polysaccharide compounds, and preferably is selected from one or more of sodium alginate and polyvinyl alcohol.

Wherein, the carbon material is graphene oxide; the transition metal compound is selected from one or more of transition metal oxides and transition metal sulfides, preferably is selected from one or more of titanium dioxide, tungsten oxide, molybdenum disulfide, cadmium sulfide, zinc oxide, ferric trioxide and vanadium pentoxide, more preferably is molybdenum disulfide or tungsten oxide, and quantum dots of molybdenum disulfide and nanoparticles of tungsten oxide are the most preferable.

The coating material is sodium alginate.

The visible light catalyst is granular, with a diameter of 2.0-3.0 mm.

The second aim of the present invention is provide a preparation method of the visible light catalyst, wherein the method comprises the following steps:

Step 1: mixing a carbon material with a transition metal compound and heating the mixture;

Step 2: processing the product obtained in Step 1 into powder;

Step 3: coating the powdery product obtained in Step 2 with a coating material to obtain the visible light catalyst.

Wherein, in Step 1, the carbon material is mixed with the transition metal compound in a solvent, and the pH value is adjusted to 10-14. The mass ratio of the carbon material and the transition metal compound is 5:(1-5), and 5:(2-4.5) is preferable, In Step 3, the amount of the coating material is 1-10 parts by weight, and preferably 2-8 parts by weight, based on 0.5-1.5 parts by weight of the powdery product.

The third aim of the present invention is to provide a visible light catalyst activated persulfate system, which includes a visible light catalyst and a persulfate. Preferably, the amount of the persulfate is 0.01-0.5 mM, preferably 0.05-0.1 mM, based on 1 mg/mL of the visible light catalyst, and the system can degrade organic pollutant with a concentration of 1-100 mM.

Wherein, the organic pollutant is one or more of carbamazepine, atrazine, degradation-resistant pesticide, persistent organic pollutants, petroleum hydrocarbon and humic acid.

The fourth aim of the present invention is to provide the use of visible light catalyst activated persulfate system in degradation of organic pollutants, wherein the application in degradation of groundwater, landfill leachate, organic wastewater, road rainwater and other water containing organic pollutants are preferable.

The fifth aim of the present invention is to provide a degradation method of organic pollutants by using a visible light catalyst activated persulfate system. Wherein, the method includes: adding the visible light catalyst and the persulfate in a solution containing organic pollutants to trigger a chemical reaction with visible light, so that to degrade the organic pollutants in the solution.

The degradation is carried out under a condition of not adjusting the pH value or not aerating.

The degradation is carried out for 30-150 min.

The present invention has the following advantages:

(1) In the present invention, the visible light catalyst which employs the carbon material with the performance of light absorption and conductivity as substrate, is loaded the transition metal compound with the characteristics of high photon-to-electron conversion efficiency onto the surfaces and combined with excellent coating performance of the coating material, is a particulate photocatalytic material with performance of high visible light catalytic activity.

(2) The visible light catalyst of the present invention has high visible light photocatalytic activity. Under the excitation by visible light, it produces photo-induced electrons and holes, then holes react with water to form hydroxyl radicals, and photo-induced electrons activate the persulfate to form sulfate radicals. The visible light catalyst can effectively remove the degradation-resistant organic pollutants by synergistically degrading with the persulfate.

(3) The visible light catalyst is in pellet (or particulate) form which improves the recovery efficiency, avoids secondary pollution caused by traditional iron-based powdery catalyst difficult to recover, and broadens the application of the persulfate advanced oxidation technology.

(4) In the present invention, the visible light catalyst activated persulfate system (i.e., a combination of visible light catalyst and persulfate) produces hydroxyl radicals with higher activity in the process of organic pollutants degradation, enhances the degradation of organic pollutants in a very small amount level, and improves degradation efficiency. For example, it can degrade the organic wastewater with organic low-concentration of 5 mM.

(5) The visible light catalyst and the visible light catalyst activated persulfate system of the present invention can be well applied in water treatment field, including the treatment of groundwater, landfill leachate, organic wastewater, road rainwater and so on. The degradation rate can be reach to 96.5%, which is of great significance to water quality assurance and improvement of water environment.

EMBODIMENTS OF THE INVENTION

Figure 1:
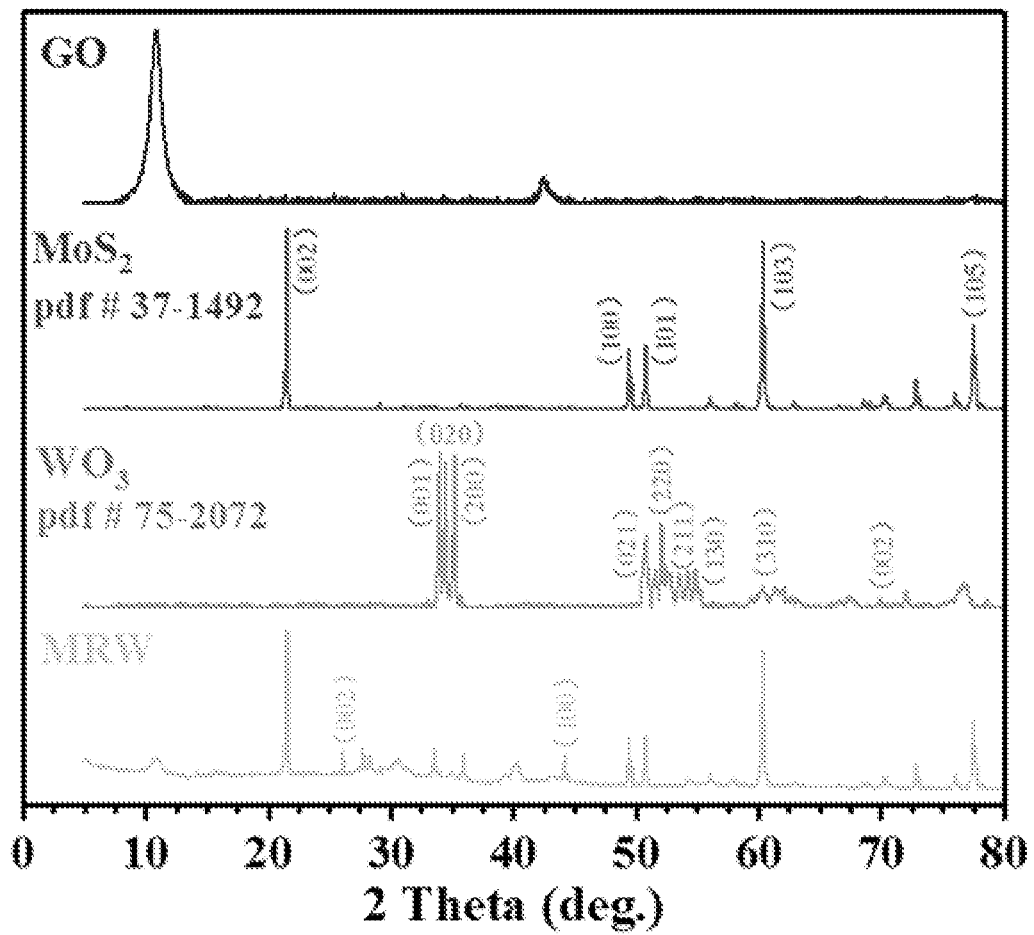
FIG. 1 shows the XRD Spectrum of Experimental Example 1 of the present invention.

The present invention is further illustrated by the following figures and preferred embodiments. Thus, the features and advantages of the present invention will be more explicit.

In the present invention, traditional persulfate advanced oxidation technology is mainly applicable to the treatment of high-concentration organic wastewater, but cannot completely degrade low-concentration degradation-resistant organic pollutants. In addition to low degradation rate, the existing persulfate activator is in powder form, which is difficult to recover and easily resulting in secondary pollution.

According to the present invention, the visible light catalyst is granular or in pellet form, and is composed of a carbon material, a transition metal compound and a coating material.

According to the present invention, the conductive carbon material is preferable. Preferably, the carbon material is one or more of graphene oxide (GO), carbon nanotube, fullerene reduced graphene oxide, and so on, and reduced graphene oxide (rGO) is more preferable.

According to the present invention, GO can be prepared by a method commonly used by technicians in the field, wherein Improved Hummers method is more recommended. Specifically, it is to dissolve graphite powder in concentrated sulfuric acid, add potassium permanganate after it cools down, then add hydrogen peroxide and well blend the mixture, and then obtain precipitate by centrifuging and filtering, and finally clean the precipitate to obtain GO powder, which is multilayer GO nanosheets.

The GO prepared in the present invention has a lamellar structure, and can be converted to rGO by hydrothermal reduction. rGO can be employed as substrate loaded with transition metal compound. rGO is used in visible light catalyst to improve its photon-to-electron conversion efficiency.

According to the present invention, the transition metal compound is selected from one or more of transition metal oxides, transition metal sulfides, and acid or salt compounds containing a transition metal, and is preferably selected from one or more of transition metal oxides and/or transition metal sulfides.

According to preferred embodiment of the present invention, the transition metal is selected from one or more of Ti, W, Mo, Zn, Cd, Fe, V and Ni.

According to further preferred embodiment of the present invention, the transition metal compound is selected from one or more of molybdenum disulfide ($MoS_2$), tungsten oxide ($WO_3$), titanium dioxide ($TiO_2$), zinc oxide (ZnO), ferric oxide ($Fe_2O_3$), vanadium pentoxide ($V_2O_5$) and cadmium sulfide ($CdS_2$), and a mixture of two or more is preferable.

In the present invention, it is more favorable for separating electrons from holes and producing free radicals with high activity which can oxidize organic pollutants to select two kinds of transition metal compounds. Therefore, it is conducive to catalytic degrading organic pollutants, activating persulfate and improving degradation efficiency.

According to the present invention, the coating material is selected from one or more of sodium alginate and polyvinyl alcohol, and sodium alginate is preferable.

In the present invention, the coating material can coat the conductive material and the transition metal compound to make it in a pellet form, and is further processed to obtain granular catalyst. Sodium alginate is utilized as the coating material because of its characteristics such as excellent performance, pollution-free and environmentally friendly.

According to preferred embodiment of the present invention, reduced graphene oxide is selected as the carbon material, molybdenum disulfide and tungsten oxide are selected as transition metal compounds, and sodium alginate is selected as the coating material.

According to the present invention, quantum dots of molybdenum disulfide is preferable since its particle diameter is less than 10 nm, and it is with good performance of light absorption and light conversion efficiency. It can improve the photo-to-electron conversion efficiency by utilizing quantum dots of molybdenum disulfide in the visible light catalyst.

According to the present invention, quantum dots of molybdenum disulfide is prepared as follows: adding molybdenum disulfide powder into an organic solvent for ultrasonic dispersion, then standing, and then collecting the supernatant and stirring for 4-8 hours at 120-160° C., and finally post-processing to produce quantum dots of molybdenum disulfide.

According to the preferred embodiment of the present invention, molybdenum disulfide powder is produced by Sinopharm Chemical Reagent Co., Ltd., and the organic solvent is preferably selected from one or more of N,N-dimethylformamide, methanol, ethanol and so on.

According to the present invention, nanoparticles of tungsten oxide with a particle diameter of 40-70 nm (wherein, 45-65 nm is preferable) is selected. The nanoparticles of tungsten oxide can be either commercially available or self-made, wherein, the following preparation method is preferable, by calcining a salt compound containing tungsten, then dissolving the calcined product in water, and then ultrasonically processing, centrifuging and filtering to obtain the nanoparticles of tungsten oxide.

According to the present invention, tungstate, such as ammonium tungstate, is preferably selected as the salt compound containing tungsten.

According to the present invention, the procedure of calcination lasts for 2-6 hours (wherein 4 hours is preferable) at 500-600° C. (wherein 550° C. is preferable).

According to preferred embodiments of the present invention, the procedure of ultrasonic dispersion lasts for 2-6 hours at 2-10° C., wherein it is preferable to last for 4 hours at 4° C. It can fully disperse and refine the molybdenum disulfide by using the ultrasonic dispersion method, so as to be conductive to obtaining the quantum dots of molybdenum disulfide.

According to preferred embodiments of the present invention, the upper supernatant is collected and stirred for 6 hours at 140° C. to further disperse the molybdenum disulfide particles.

According to the present invention, the post-processing procedure includes centrifugation, filtration and drying. The drying is carried out under vacuum conditions, and is preferably carried out at 60-80° C., so as to obtain quantum dots of molybdenum disulfide.

According to the present invention, the visible light catalyst is prepared by a method comprising the following steps:

Step 1: mixing the carbon material and the transition metal compound, then heating the mixture;

Step 2: processing the product obtained in Step 1 into powder;

Step 3: coating the powdery product obtained in Step 2 with the coating material, to obtain the visible light catalyst.

According to the present invention, in Step 1, the mixing process is to disperse the carbon material in a solvent, add the transition metal compound, adjust the pH value, and then heat the mixture.

According to the present invention, in Step 1, the solvent is preferably selected from ethanol, acetone and methanol, and ethanol is more preferable.

According to the present invention, in Step 1, the mass ratio of the carbon material and the transition metal compound is 5:(1-5), and 5:(2-4.5) is preferable.

According to the present invention, in Step 1, the transition metal compound is preferably selected from transition metal sulfides and transition metal oxides, and quantum dots of molybdenum disulfide and tungsten oxide are preferable.

According to the present invention, in Step 1, the mass ratio of transition metal sulfide and transition metal oxide is (1-2):1.

According to the present invention, in Step 1, the pH value is adjusted to 8-14, wherein 10-12 is preferable and 10 is more preferable, since it is conducive to the dissolution of transition metal oxides and transition metal sulfides as well as reactions.

According to the present invention, in Step 1, hydrothermal treatment method is preferable. The procedure of heating treatment lasts for 12-24 hours at 160-200° C., and 24 hours at 160° C. is preferable.

In the present invention, transition metal compounds are loaded on the surface of the carbon material after heat treatment. For example, the surface of rGO is loaded with or modified by quantum dots of molybdenum disulfide and nanoparticles of tungsten oxide.

According to the present invention, in Step 2, the product obtained in Step 1 is post-processed into powder, that is the powdered catalyst. The post-processing includes ultrasonic dispersion, centrifugation, filtration and/or drying, and so on, and freeze-drying treatment is preferable. The product obtained in Step 1 is processed with freeze-drying treatment to obtain solid powdery product. It can reduce the loss of quantum dots of molybdenum disulfide and increase the product yield by using freeze-drying treatment. On the contrary, it is easily lead to the loss of quantum dots of molybdenum disulfide by using other drying techniques, such as low-temperature drying treatment.

In the present invention, graphene oxide is partially reduced to reduced graphene oxide after heat-treated. The reduced graphene oxide with lamellar structure is employed as the substrate, and quantum dots of molybdenum disulfide and nanoparticles of tungsten oxide are loaded on the surface of reduced graphene oxide. The lattice fringes of nanoparticles of tungsten oxide and quantum dots of molybdenum disulfide can be observed clearly on the substrate of rGO, which indicates that the two-phase compounds are tightly bound. As a result, it is conducive to separating the electron hole pairs between the nanoparticles of tungsten oxide and quantum dots of molybdenum disulfide, and to catalytic degradation and activation of the persulfate.

According to the present invention, in Step 3, the coating process is to dissolve the coating material in the solvent, add the powdery product obtained in Step 2 to give a mixed solution, and then add the mixed solution into saturated calcium chloride solution, to obtain the visible light catalyst (MRW).

According to the present invention, in Step 3, water is employed as the solvent in the coating process. It is to add 0.5-12 g of the coating material into 100 mL of solvent, 1-10 g is preferable, 2-8 g is more preferable, and 2-6 g is the most preferable.

According to the present invention, in Step 3, the mass ratio of the coating material and the powdery product is 1.1-15, and 1.2-12 is preferable.

According to preferred embodiments of the present invention, in Step 3, the amount of the coating material is 1-10 parts by weight, preferably 2-8 parts by weight, and more preferably 2-6 parts by weight, based on 0.5-1.5 parts by weight of the powdery product.

In the present invention, the visible light catalyst is prepared by coating the powdery product with the coating material. After that, the visible light catalyst is in pellet form, which is easier to recover comparing to powdery catalyst. Moreover, the coating material has a distinct advantage in application because of its characteristics such as environmentally friendly, pollution-free and better adsorption property. It can absorb pollutants rapidly and degrade the pollutants by photocatalysis, so as to increase the degradation rate, which can reach more than 75%, even up to 96.5% for organic pollutants removal or degradation.

According to the present invention, the visible light catalyst has high sensitivity of photocurrent signal. Under visible light, the photocurrent density of the visible light catalyst can reach 7 $\mu A/cm^2$, which indicates a good electron transfer capacity.

In the present invention, the visible light catalyst has an excellent performance of charge transfer. Moreover, it is conductive to improving the performance of charge transfer under visible light by modifying or loading graphene oxide with quantum dots of molybdenum disulfide and nanoparticles of tungsten oxide. Due to the carrier lifetime is longer and the charge transfer speed is fast, it can inhibit the recombination of electron hole pairs and generate high photocurrent density. It is to increase the capacity of degrading organic pollutants by utilizing the performance of catalytic degradation and activated persulfate.

In the present invention, the visible light catalyst is in pellet form which improves the recovery efficiency, avoids the secondary pollution caused by traditional iron-based powdery catalyst due to it is difficult to recover, and broadens the application of the persulfate advanced oxidation technology.

In the present invention, it also provides a visible light catalyst activated persulfate system, which includes the visible light catalyst and the persulfate. Wherein, the preferred visible light catalyst has been described in the first aspect of the present invention.

According to the present invention, the persulfate is selected from one or more of sodium persulfate, potassium persulfate, ammonium persulfate, and so on, and sodium persulfate is preferable.

According to the present invention, it is to add 0.01-0.5 mM of the persulfate (wherein 0.05-0.1 mM is preferable) into 1 mg/mL of the photocatalyst.

In the present invention, the degradation rate of the visible light catalyst activated persulfate system can be basically remained unchanged after being used in the process of organic pollutants degradation for several times, therefore the system demonstrates a good chemical stability.

The present invention provides a method of degrading organic pollutants in wastewater by using the composite visible light catalyst. The method includes: add the visible light catalyst and the persulfate (visible light catalyst activated persulfate system) into a solution containing organic pollutants (such as organic wastewater), then mix and form a reaction system in dark environment, and then place the mixture or the reaction system under visible light to irradiate, so as to degrade organic pollutants by the visible light catalyst activated persulfate system.

According to the present invention, visible light which its wavelength is longer than 420 nm is generated by visible light generator, and xenon lamp is preferable.

According to the present invention, the exposure intensity of visible light is 0.05-1 $mW/cm^2$, and 0.1-0.5 $mW/cm^2$ is preferable.

In the present invention, the degradation rate and efficiency of organic pollutants degradation is in direct proportion to the exposure intensity of visible light, since more electron hole pairs are generated under bright light, thus more hydroxyl radicals and sulfate radicals are generated, so as to it is conducive to synergistically degrading organic pollutants by the visible light catalyst and the persulfate.

According to the present invention, it is to add the visible light catalyst and the persulfate into water containing organic pollutants, then mix, and it is preferable to stir the mixture, such as using a magnetic stirrer.

According to the present invention, it is to add 0.01-0.5 mM of persulfate (wherein 0.05-0.1 mM is preferable) into 1 mg/mL of visible light catalyst.

According to the present invention, the visible light catalyst activated persulfate system can degrade organic pollutants with a concentration of 1-100 mM, wherein 5-50 mM is preferable and 5-25 mM is more preferable. The system is more applicable to the degradation of low-concentration organic pollutants because of the characteristic of the persulfate advanced oxidation technology, which the degradation rate can reach 80%.

According to the present invention, the water containing organic pollutants includes groundwater, landfill leachate, organic wastewater and road rainwater, with a pH value of 5-9.

According to the present invention, the organic pollutant is one or more of carbamazepine (CBZ), atrazine (ATZ), persistent organic pollutants (POPS) and degradation-resistant pesticide (Pesticide), for example carbamazepine (CBZ) in organic wastewater.

In the present invention, the chemical oxygen demand can be used to measure the organic pollutants load, therefore, the concentration of organic pollutants in water can be expressed by the concentration of chemical oxygen demand (COD).

According to the present invention, the reaction system is underwent in dark environment and preferably lasts for 30 minutes in order to eliminate adsorption effects caused by visible light catalyst and persulfate.

According to the present invention, after processing in dark environment, the reaction system (or mixture) is irradiated with visible light to carry out the reaction, i.e. degradation reaction, while stirring the mixture. The reaction lasts for 1-5 hours, wherein 2-4 hours is preferable, for example 2 hours. The rotating speed of stirring is 30 r/min or more, and 30 r/min is preferable.

According to the present invention, there is no need to adjust the pH value or aerate during the degradation reaction.

In the present invention, there is no oxygen involved in the reaction system, therefore aeration does not improve the effect of degradation. And it is not necessary to adjust the pH value during the reaction since the pH value of actual water is 5-9, which has no effect on the reaction.

The visible light catalyst of the present invention has high visible light catalytic activity and can degrade the organic pollutants while catalytic activating persulfate to increase the processing capacity of organic pollutants degradation.

In the present invention, the degradation rate of visible light catalyst activated persulfate system is more than 75% for organic pollutants, wherein the rate achieves preferably more than 80%, more preferably 93.3%, and most preferably around 95%.

In the present invention, when the visible light catalyst activated persulfate system degrades organic pollutants in polluted water, under the excitation by visible light and by using the response characteristic of visible light, photo-induced electrons and holes are produced by the visible light catalyst. The holes react with water to form hydroxyl radicals, and the photo-induced electrons activate persulfate to form sulfate radicals. By the means of synergistic effect between hydroxyl radicals and sulfate radicals, the persulfate is activated to degrade pollutants and further effectively degrade the degradation-resistant organic pollutants.

EXAMPLES

Example 1

Adding 0.83 g of graphite powder into 100 mL of concentrated sulfuric acid of 98 wt. %, adding 2.49 g of $KMnO_4$ at 10° C., continuously stirring for 24 hours to obtain a reaction mixture; transferring the reaction mixture into a 100 mL volumetric flask to make 100 mL, and adding 16.6 mL of $H_2O_2$ of 10 wt. %; intensively mixing, and then obtaining precipitation by centrifugation and filtration; cleaning repeatedly the precipitation with ultrapure water and hydrochloric acid, and finally obtaining multilayer graphene oxide nanosheets;

Adding 2 g of $MoS_2$ powder into 200 mL of N,N-dimethylformamide, treating the mixture by ultrasonic treatment for 4 hours at 4° C., and then standing for 24 hours; collecting the upper supernatant and stirring continuously for 6 hours at 140° C., centrifuging and filtering the obtained product; and finally obtaining quantum dots of molybdenum disulfide by drying under vacuum condition at 60° C.;

Calcining 2 g of ammonium tungstate for 4 hours at 550° C., then dissolving thoroughly the obtained product in 50 mL of ultrapure water; and treating the mixture by ultrasonic treatment, centrifugation and filtration to obtain $WO_3$ nanoparticles.

Example 2

Dispersing 50 mg of multilayer graphene oxide nanosheets in 20 mL of ethylene glycol, then adding 10 mg quantum dots of molybdenum disulfide and 10 mg nanoparticles of tungsten oxide; adjusting the pH value to 10 and heating the mixture for 24 hours at 160° C.; treating the mixture by ultrasonic treatment, centrifugation, filtration and drying to obtain $rGO/MoS_2/WO_3$ powders;

Adding 2 g of sodium alginate into 100 mL of ultrapure water, then adding 0.5 g $rGO/MoS_2/WO_3$ powders to obtain a mixed solution; dripping the mixed solution into saturated $CaCl_2$ aqueous solution to obtain granular $rGO/MoS_2/WO_3$ coated by sodium alginate, that is, the visible light catalyst;

The visible light catalyst generated is black pellets with a diameter of about 2.5 mm.

Example 3

Dispersing 50 mg of multilayer graphene oxide nanosheets in 20 mL of ethylene glycol, then adding 30 mg quantum dots of molybdenum disulfide and 15 mg nanoparticles of tungsten oxide; adjusting the pH value to 10 and heating the mixture for 24 hours at 160° C.; treating the mixture by ultrasonic treatment, centrifugation, filtration and drying to obtain $rGO/MoS_2/WO_3$ powders;

Adding 6 g of sodium alginate into 100 mL of ultrapure water, then adding 1.5 g $rGO/MoS_2/WO_3$ powders; dripping the mixed solution into saturated $CaCl_2$ aqueous solution to obtain granular $rGO/MoS_2/WO_3$ coated by sodium alginate, that is, the visible light catalyst.

Example 4

Adding 1 mg/mL of visible light catalyst obtained in Example 2 and 0.1 mM of sodium persulfate into organic wastewater with total organic carbon concentration of 2,454 mg/L and CBZ (carbamazepine) concentration of 10 mM; first placing the reaction system in dark environment and stirring for 30 minutes, then stirring the reaction system at rotating speed of 30 r/min for 2 hours under visible light with exposure intensity of 0.3 $mW/cm^2$; without adjusting the pH value of the reaction system and aerating, the degradation rate is measured to reach 83.3%.

Example 5

Adding 1 mg/mL of visible light catalyst obtained in Example 2 and 0.1 mM of sodium persulfate into organic wastewater with total organic carbon concentration of 136 mg/L and CBZ (carbamazepine) concentration of 10 mM; first placing the reaction system in dark environment and stirring for 30 minutes, then stirring the reaction system at rotating speed of 30 r/min for 2 hours under visible light with exposure intensity of 0.3 $mW/cm^2$; the degradation rate is measured to reach 83.1%.

Example 6

Adding 4 mg/mL of visible light catalyst obtained in Example 2 and 0.2 mM of sodium persulfate into organic wastewater with total organic carbon concentration of 2,454 mg/L and CBZ (carbamazepine) concentration of 10 mM; first placing the reaction system in dark environment and stirring for 30 minutes, then stirring the reaction system at rotating speed at 30 r/min for 2 hours under visible light with exposure intensity of 0.3 m $W/cm^2$; the degradation rate is measured to reach 87.7%

Example 7

Adding 4 mg/mL of visible light catalyst obtained in Example 2 and 0.2 mM of sodium persulfate into organic wastewater with total organic carbon concentration of 136 mg/L and CBZ (carbamazepine) concentration of 10 mM; first placing the reaction system in dark environment and stirring for 30 minutes, then stirring the reaction system at rotating speed of 30 r/min for 2 hours under visible light with exposure intensity of 0.3 $mW/cm^2$; the degradation rate is measured to reach 92.5%.

Example 8

Adding 1 mg/mL of visible light catalyst obtained in Example 3 and 0.1 mM of sodium persulfate into organic wastewater with total organic carbon concentration of 2,454 mg/L and CBZ (carbamazepine) concentration of 10 mM; first placing the reaction system in dark environment and stirring for 30 minutes, then stirring the reaction system at rotating speed of 30 r/min for 2 hours under visible light with exposure intensity of 0.3 mW/cm$^2$; the degradation rate is measured to reach 92.4%.

Example 9

Adding 1 mg/mL of visible light catalyst obtained in Example 3 and 0.1 mM of sodium persulfate into organic wastewater with total organic carbon concentration of 136 mg/L and CBZ (carbamazepine) concentration of 10 mM; first placing the reaction system in dark environment and stirring for 30 minutes, then stirring the reaction system at rotating speed of 30 r/min for 2 hours under visible light with exposure intensity of 0.3 mW/cm$^2$; the degradation rate is measured to reach 92.4%.

Example 10

Adding 4 mg/mL of visible light catalyst obtained in Example 3 and 0.2 mM of sodium persulfate into organic wastewater with total organic carbon concentration of 2,454 mg/L and CBZ (carbamazepine) concentration of 10 mM; first placing the reaction system in dark environment and stirring for 30 minutes, then stirring the reaction system at rotating speed of 30 r/min for 2 hours under visible light with exposure intensity of 0.3 mW/cm$^2$; the degradation rate is measured to reach 91.6%.

Example 11

Adding 4 mg/mL of visible light catalyst obtained in Example 3 and 0.2 mM of sodium persulfate into organic wastewater with total organic carbon concentration of 136 mg/L and CBZ (carbamazepine) concentration of 10 mM; first placing the reaction system in dark environment and stirring for 30 minutes, then stirring the reaction system at rotating speed of 30 r/min for 2 hours under visible light with exposure intensity of 0.3 mW/cm$^2$; the degradation rate is measured to reach 93.3%.

Example 12

Repeating the preparation process in Example 4, but with one difference, that is, adjusting the exposure intensity of visible light to 0.1 mW/cm$^2$.

Example 13

Repeating the preparation process in Example 4, but with one difference, adjusting the exposure intensity of visible light to 0.2 mW/cm$^2$.

Example 14

Repeating the preparation process in Example 4, but with one difference, adjusting the exposure intensity of visible light to 0.4 mW/cm$^2$.

Example 15

Repeating the preparation process in Example 4, but with one difference, adjusting the exposure intensity of visible light to 0.5 mW/cm$^2$.

Example 16

Repeating the preparation process in Example 4, but with one difference, using the organic wastewater with CBZ (carbamazepine) concentration of 5 mM.

Example 17

Repeating the preparation process in Example 4, but with one difference, using the organic wastewater with CBZ (carbamazepine) concentration of 15 mM.

Example 18

Repeating the preparation process in Example 4, but with one difference, using the organic wastewater with CBZ (carbamazepine) concentration of 20 mM.

Example 19

Repeating the preparation process in Example 4, but with one difference, using the organic wastewater with CBZ (carbamazepine) concentration of 25 mM.

Example 20

Adding 5 g of visible light catalyst obtained in Example 2 into 500 mL of polluted groundwater with COD concentration of 137 mg/L, the COD removal efficiency is 76.7%.

Example 21

Adding 5 g of visible light catalyst obtained in Example 2 into 500 mL of landfill leachate with COD concentration of 2,436 mg/L, the COD removal efficiency is 88.3%.

Example 22

Adding 5 g of visible light catalyst obtained in Example 2 into 500 mL of initial rainwater with COD concentration of 5,487 mg/L, the COD removal efficiency is 96.5%.

Comparative Examples

Comparative Example 1

Repeating the preparation process in Example 4, but with one difference, not adding visible light catalyst.

Comparative Example 2

Repeating the preparation process in Example 4, but with two differences, not adding persulfate and not treating the mixture in dark environment.

Experimental Examples

Experimental Example 1

The visible light catalyst prepared in Example 2 is subject to XRD test, and the results are shown in FIG. 1. Referring to the standard cards of MoS$_2$ and WO$_3$ and the XRD Spectrum of GO, the diffraction peaks of the visible light catalyst is at 21.44°, 49.43°, 50.74°, 60.36° and 77.46°, corresponding to the lattice planes of (002), (100), (101), (103) and (105) on the standard card of $MoS_2$ (PDF #37-1492). The diffraction peaks at 34.84°, 35.55°, 36.70°, 52.01°, 50.63°, 51.53° and 64.17° correspond to the lattice planes of (001), (020), (200), (220), (021), (021) and (221) on the standard card of $WO_3$ (PDF #75-2072). Visible light catalyst (MRW) shows two diffraction peaks at near 26.20° and 44.53°, which is accordance with the diffraction peaks of rGO. Meanwhile, the weak diffraction peak of GO at near 10.90° was also observed in the XRD spectrum of rGO, and the surface of GO was partially reduced. Comparing to the X-ray diffraction patterns of GO, $MoS_2$ and $WO_3$, the visible light catalyst shows no obvious peak shift, which indicates that there is no obvious structural changes occurred in the hydrothermal process. According to test results of XRD, GO, $MoS_2$ and $WO_3$ were successfully synthesized, GO was successfully reduced to rGO, and rGO was modified by $MoS_2$ and $WO_3$.

Experimental Example 2

The nanoparticles of tungsten oxide, quantum dots of molybdenum disulfide and visible light catalyst prepared in Example 2 were analyzed by HRTEM method. The diameter of nanoparticles of tungsten oxide is mainly distributed in the range of 40-70 nm; oxygen and tungsten are the main elements and evenly distributed.

The quantum dots of molybdenum disulfide are uniform with a diameter of around 10 nm. The Mo and S are the main elements and evenly distributed. The visible light catalyst, which the rGO substrate with typical fold morphology can be clearly observed. The nanoparticles of tungsten oxide and quantum dots of molybdenum disulfide are well dispersed and modified on the surface of rGO. The lattice fringes of $MoS_2$ quantum dots with a lattice distance of 0.615 nm and $WO_3$ nanoparticles with a lattice distance of 0.375 nm fall into the lattice planes of (002) and (020), which is accordance with the XRD results. It is easy to distinguish between the nanoparticles of tungsten oxide and quantum dots of molybdenum disulfide due to the different particle sizes.

Nanoparticles of tungsten oxide and quantum dots of molybdenum disulfide appear clear lattice fringes on the rGO substrate, which indicate that they are tightly bound. Thus, it is conducive to separating the electron hole pairs between the nanoparticles and quantum dots, and to the catalytic degradation and activation of persulfate.

Experimental Example 3

Figure 2:
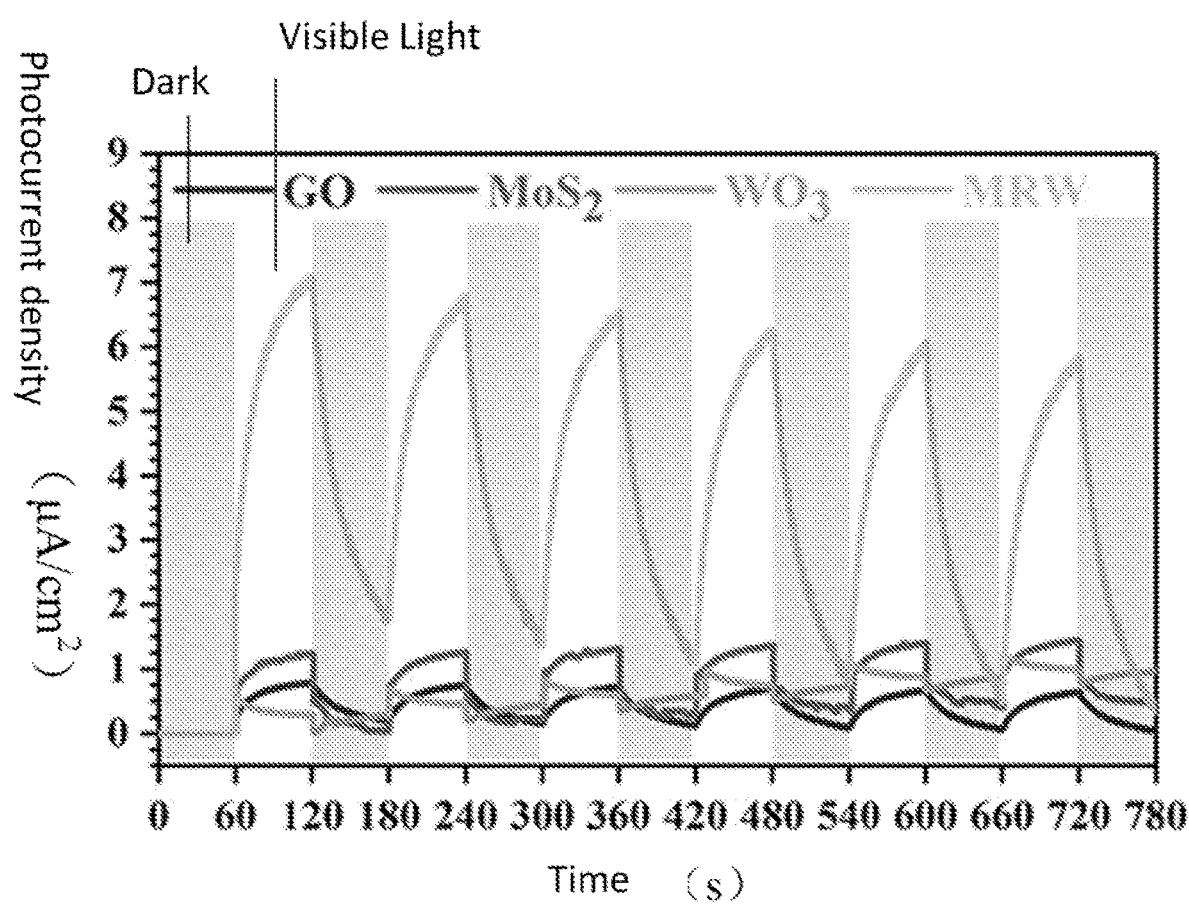
FIG. 2 shows the Optical-electrical Characteristic Curve of Experimental Example 3 of the present invention.

The quantum dots of molybdenum disulfide, nanoparticles of tungsten oxide prepared in Example 1 and samples of visible light catalyst prepared in Example 2 were tested via optical-electrical characteristic test, and the results are shown in FIG. 2.

As shown in FIG. 2, all samples show high sensitivity of photocurrent signal when the visible light is turned on or off. The photocurrent density of the visible light catalyst (MRW) rises rapidly up to 7 $\mu A/cm^2$ under visible light, on the contrary, it immediately decreases significantly in dark environment. Comparing to others, $WO_3$ nanoparticles show a better performance of recombination movement and electron transfer movement under both visible light and dark environment. Comparing to the others samples, the visible light catalyst has better effects on persulfate activation and catalytic degradation due to its characteristics such as high efficiency of separating electron hole pairs and long-life photocarriers.

Experimental Example 4

Figure 3A:
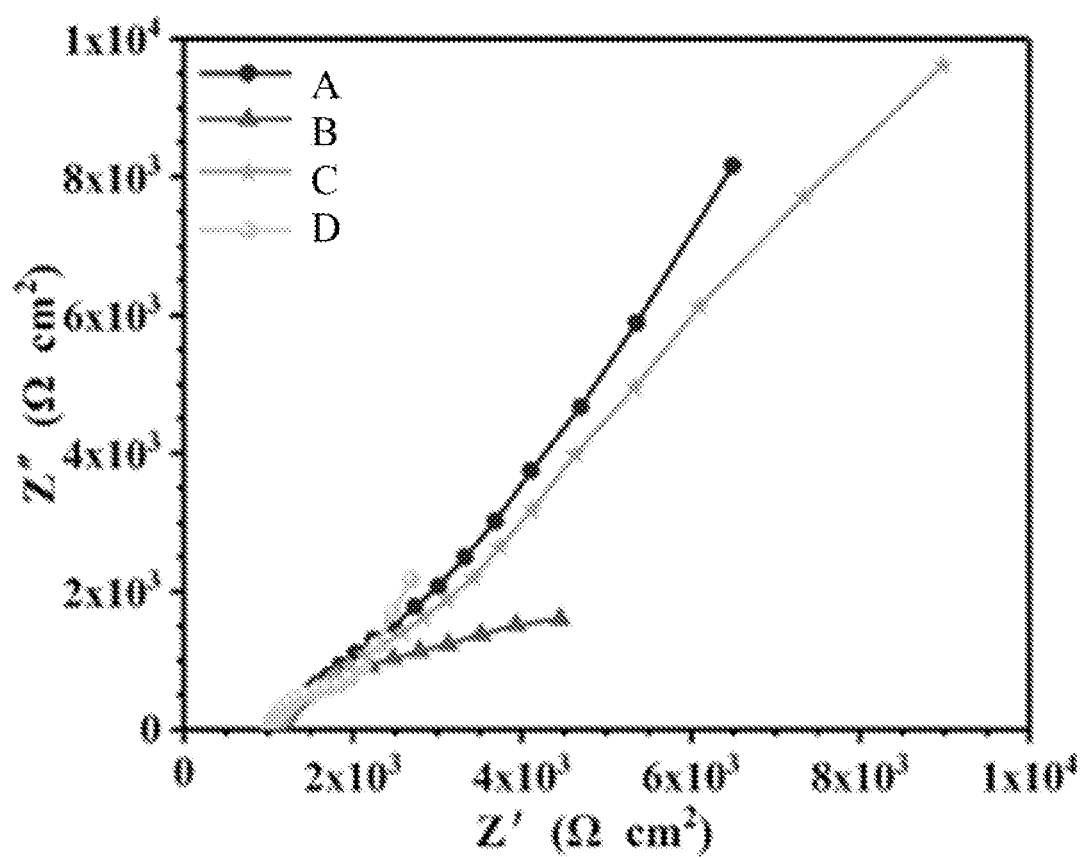
FIG. 3a shows the EIS Spectrum of Experimental Example 4 of the present invention.
Figure 3B:
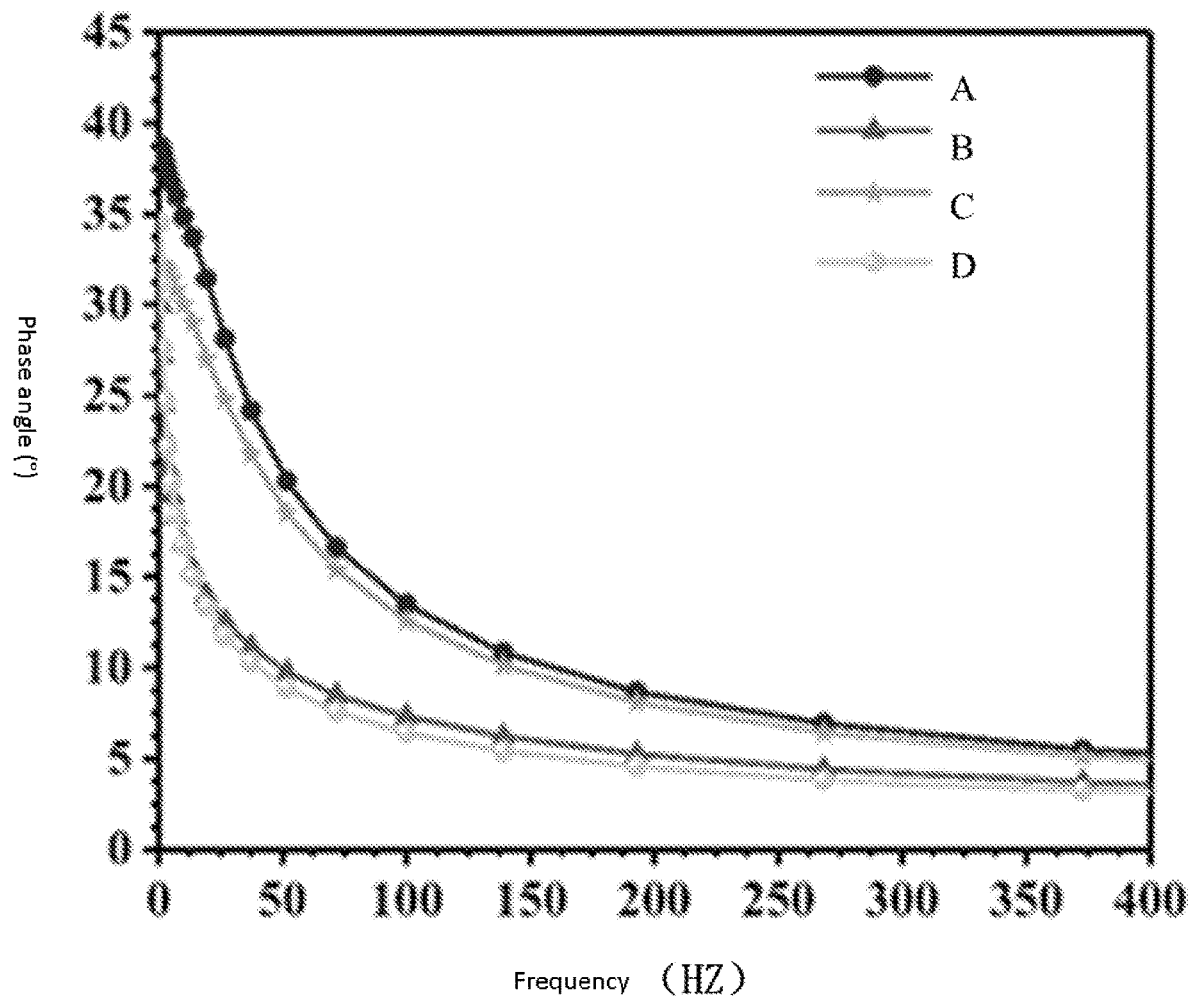
FIG. 3b shows the Bode Plot of Experimental Example 4 of the present invention.

EIS spectrum of graphene oxide, quantum dots of molybdenum disulfide and nanoparticles of tungsten oxide prepared in Example 1, and samples of visible light catalyst prepared in Example 2 is as shown in FIG. 3a. Bode Plot is as shown in FIG. 3b. Wherein, Curve A shows graphene oxide, Curve B shows quantum dots of molybdenum disulfide, Curve C shows nanoparticles of tungsten oxide, and Curve D shows visible light catalyst.

Radius of high-frequency arc and low-frequency wire are respectively related to charge transfer process and diffusion process of charge carriers, wherein smaller arc radius indicates more effective charge transfer. As shown in FIG. 3a, the relation of arc radius is D<B<C<A, which indicates that the modification of graphene oxide by quantum dots of molybdenum disulfide and nanoparticles of tungsten oxide have positive effect on improving the charge transfer performance under visible light. As shown in FIG. 3b, the relation of peaks of phase angles from high to the low is D<B<C<A, and the lower frequency shows a better performance of electron transfer, therefore, it indicates that the charge carriers of the visible light catalyst have longer life-time. In the fast charge transmitting process, it can inhibit the recombination of electron pairs and result in high photocurrent density which is accordance with the photocurrent density in FIG. 2.

Experimental Example 5

Figure 4:
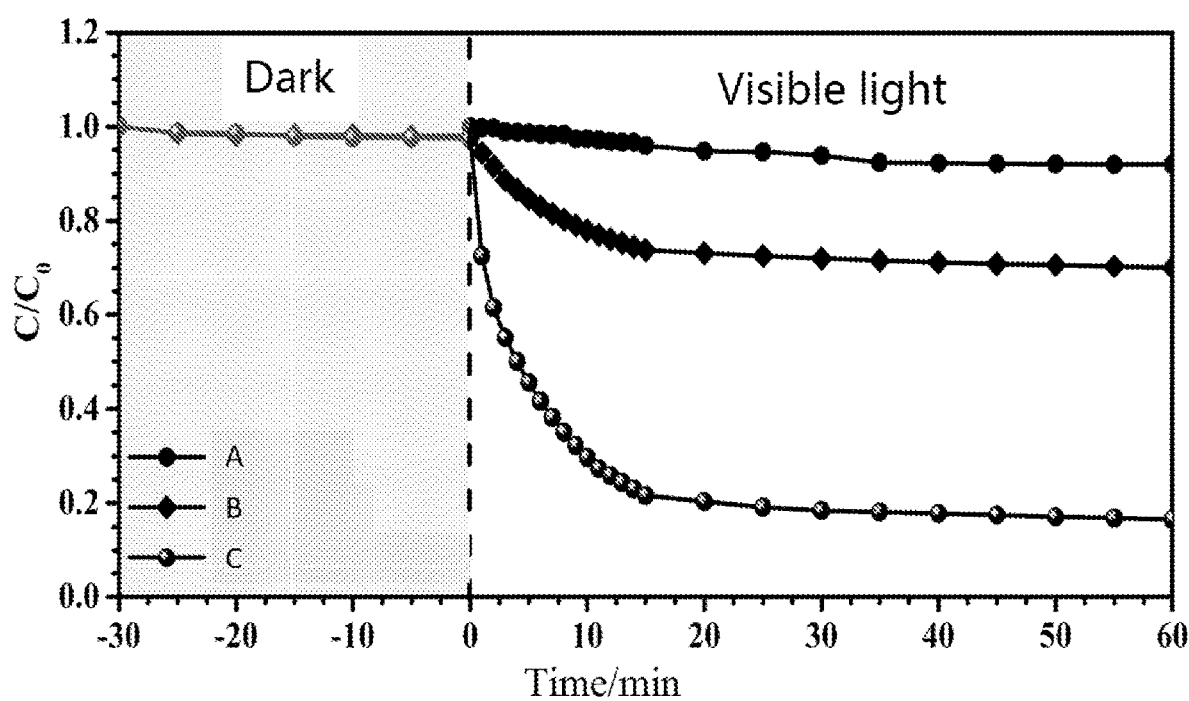
FIG. 4 shows the Degradation Rate Curve of Experimental Example 5 of the present invention.

The degradation process of CBZ in organic wastewater in Example 4, Comparison Example 1 and Comparison Example 2 are shown in FIG. 4. In FIG. 3, Curve A represents Comparison Example 1, Curve B represents Comparison Example 2, Curve C represents Example 4. As shown in FIG. 4, after 60 minutes under visible light, CBZ removal efficiency is respectively 8.03%, 28.50% and 83.33% by the persulfate, the visible light catalyst and the visible light catalyst activated persulfate system. It is difficult to activate persulfate under visible light, so the removal efficiency is low, and the same situation applies to the visible light catalyst too although it has a function of degradation, However, the CBZ removal efficiency by using visible light catalyst-persulfate system is higher, which indicates that there is synergistic catalytic degradation happened. Meanwhile, the salinity of CBZ is higher, which indicates better degradation efficiency Experimental Example 6

The cycle experiment of degrading CBZ in organic wastewater by the system under visible light carried out in Example 3 is shown in the figure, and the relations between the cycle times and degradation rate is studied. The degradation rate is expressed in $C/C_0$, wherein $C_0$ shows the initial concentration of CBZ in organic wastewater, and C shows the real-time concentration of CBZ in organic wastewater.

Figure 5:
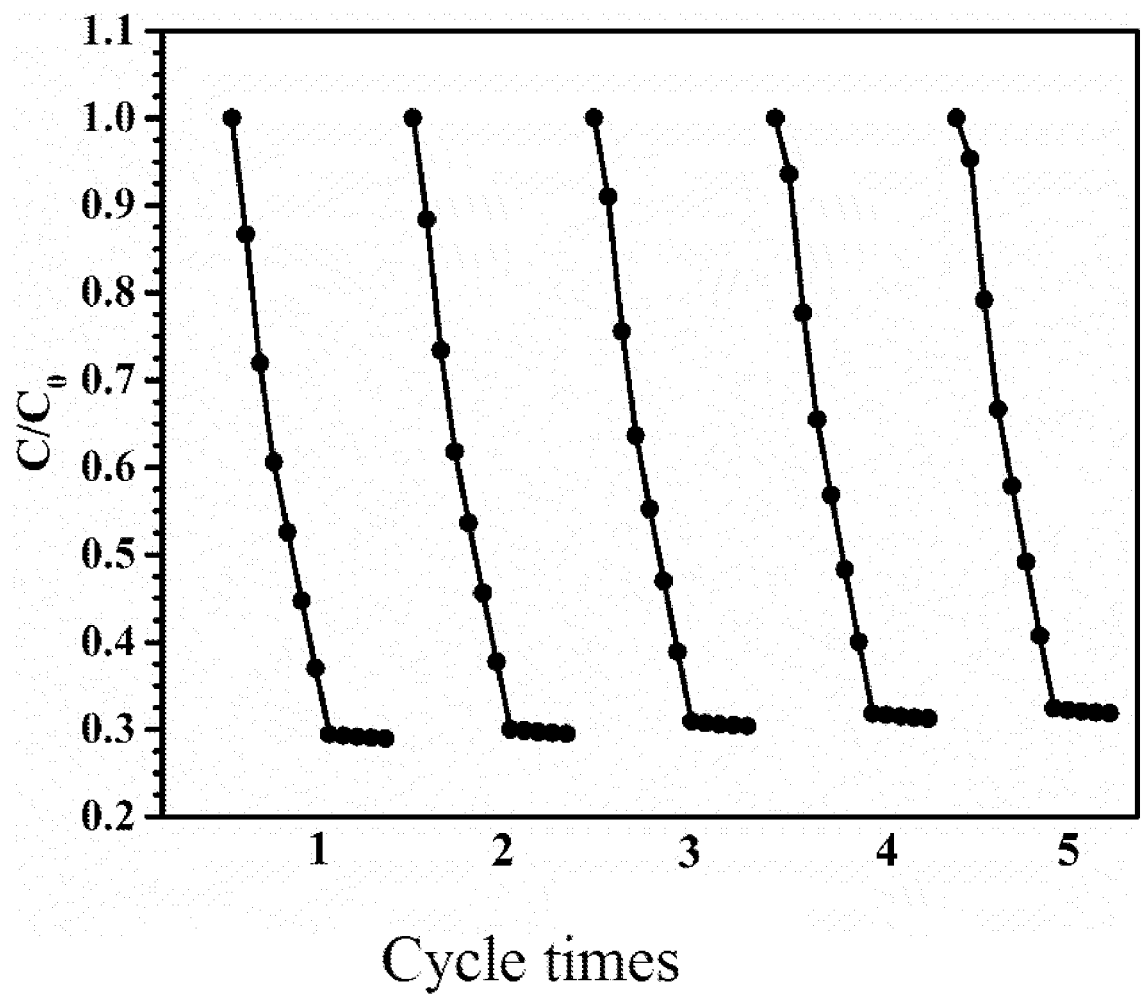
FIG. 5 shows the Cycle Index & Degradation Rate Relation Diagram of Experimental Example 6 of the present invention.

As shown in FIG. 5, the CBZ removal efficiency by using the visible light catalyst activated persulfate system is almost unchanged (around 68.2%) after 5 cycles. It indicates that there is no obvious deactivation occurred and the system has a good chemical stability.

Experimental Example 7

Figure 6:
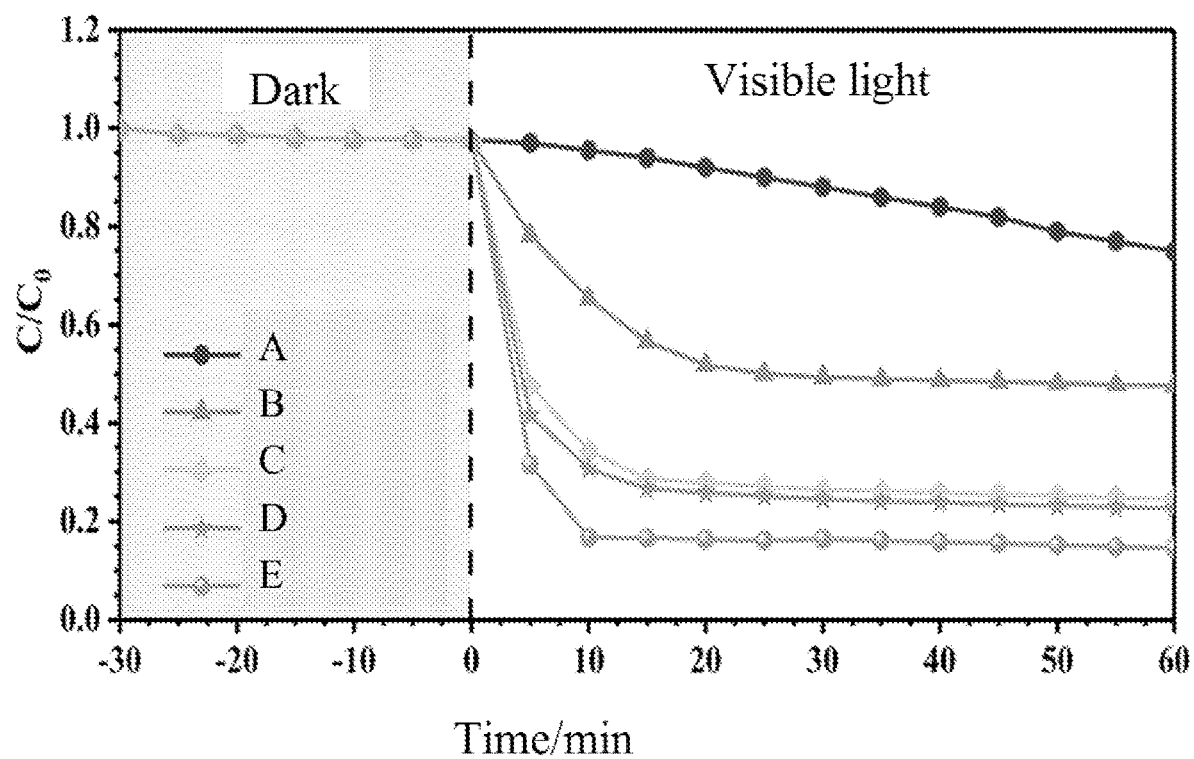
FIG. 6 shows the Degradation Rate Curve of Experimental Example 7 of the present invention.

The degradation process of CBZ in organic wastewater by the system in Example 4 and Examples 12-15 is shown in FIG. 6, wherein, Curves A represents Example 12, Curve B represents Example 13, Curve C represents Example 4, Curve D represents Example 14, and Curve E represents Example 15.

As shown in FIG. 6, the degradation performance is strongly bound up with the exposure intensity of visible light. Under visible light with exposure intensity of 0.1 $mW/cm^2$, the degradation curve is linear related to the degradation time, which indicates that the exposure intensity of visible light is a limiting factor while CBZ concentration is 10 μM. However, with an increase of the exposure intensity of visible light, the degradation rate and efficiency increase gradually, which the degradation rate can reach 83.5%, which indicates high degradation efficiency at the early stage. Under visible light with exposure intensity of 0.5 $mW/cm^2$, it can degrade 83% of CBZ in 10 minutes, which indicates good degradation performance. Since more photo-induced hole pairs are generated under the strong light, thus more hydroxyl radicals and sulfate radicals are produced, which is conducive to synergistically degrading organic pollutants by the visible light catalyst and the persulfate.

Experimental Example 8

Figure 7:
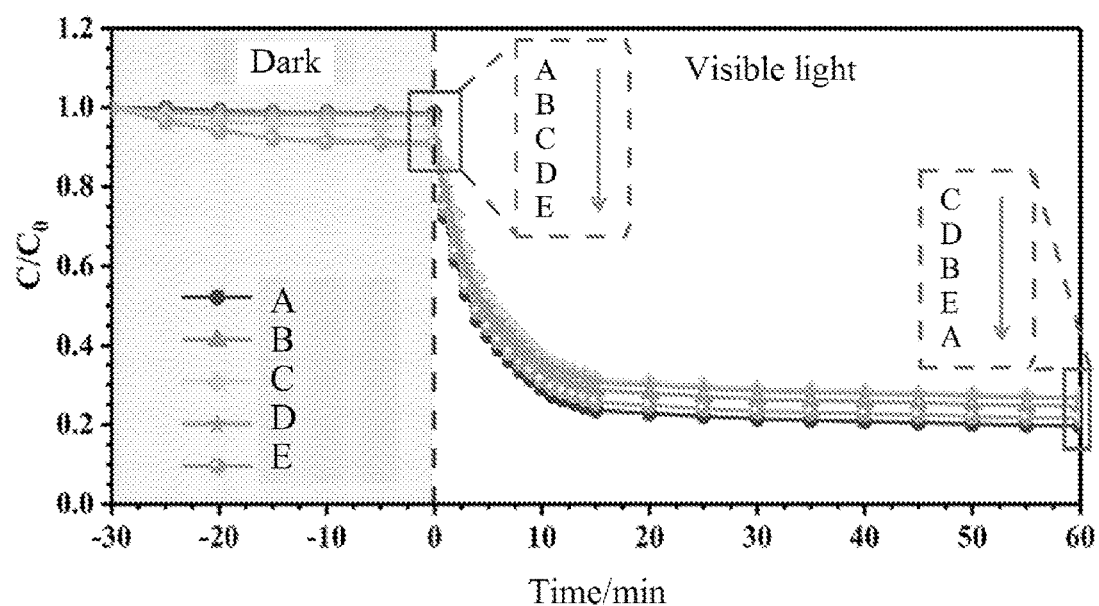
FIG. 7 shows the Degradation Rate Curve of Experimental Example 8 of the present invention.

The degradation process of CBZ in organic wastewater by the system in Example 4 and Examples 16-19 is shown in FIG. 7, wherein, Curve A represents Example 16, Curve B represents Example 4, Curve C represents Example 17, Curve D represents Example 18, and Curve E represents Example 19.

The CBZ concentration is the key factor of degradation performance. As shown in FIG. 7, in dark environment, the adsorption capacity of visible light catalyst activated persulfate is in direct proportion to CBZ concentration, and the degradation performance shows different trends. While increasing the CBZ concentration from 5 mM to 25 mM, the degradation efficiency decreases gradually. When the CBZ concentration is between 73%-81%, the degradation efficiency is similar. The visible light catalyst activated persulfate can degrade low-concentration organic pollutants to solve the problem that the persulfate advanced oxidation technology can be only applied in the treatment of high-concentration organic wastewater, thus it broadens the application of the technology.

The present invention has been described in detail through the preferred embodiments and examples. However, it should be understood that the description does not make any restrictions to the scope of the present invention. Without departing from the sprit and scope of the present invention, various modifications, improvement, and replacements is permitted, and will be seen in the scope of the present invention. The protection scope of the invention is subject to the attached claims.

What is claimed is:

1. A method for preparing a visible light catalyst, characterized in that, which comprises the following steps:
   Step 1: mixing a carbon material with a transition metal compound into a mixture, then heating the mixture; wherein the carbon material is graphene oxide; the transition metal compound is quantum dots of molybdenum disulfide or nanoparticles of tungsten oxide;
   Step 2: processing the mixture obtained in Step 1 into a powder product;
   Step 3: coating the powder product obtained in Step 2 with a coating material to obtain the visible light catalyst; wherein the coating material is a polysaccharide compound.

2. The method according to claim 1, characterized in that:
   in Step 1, the carbon material is mixed with the transition metal compound in a solvent, and pH value is adjusted to 10-14, wherein the mass ratio of the carbon material and the transition metal compound is 5:(1-5),
   in Step 3, the mass ratio of the coating material and powder product is—1:(1-15).

3. The method according to claim 2, wherein the mass ratio of the carbon material and the transition metal compound is 5:(2-4.5).

4. The method according to claim 3, wherein in Step 1, heating the mixture at 200° C. for 24 hours.

5. The method according to claim 2, wherein the mass ratio of the coating material and the powder product is 1:(2-12).

6. The method according to claim 1, wherein the polysaccharide compound is sodium alginate.

7. The method according to claim 1, wherein the visible light catalyst is a granular with a diameter of 2.0-3.0 mm.

8. The method according to claim 7, wherein the polysaccharide compound is sodium alginate.

9. The method according to claim 1, wherein in Step 1, heating the mixture at 160-200° C. for 12-24 hours.

\* \* \* \* \*